Sept. 7, 1965 W. J. WILLIAMS Re. 25,854
MULTIPLE SWITCH SPEED CONTROLLED MECHANISM
Original Filed Feb. 16, 1954 4 Sheets-Sheet 1
FIG. I
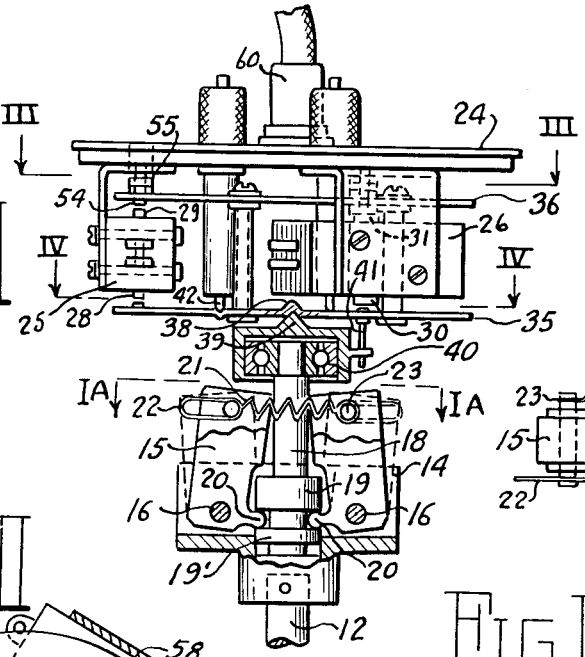
FIG. IA
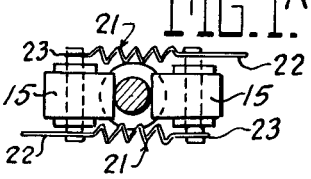
FIG. III
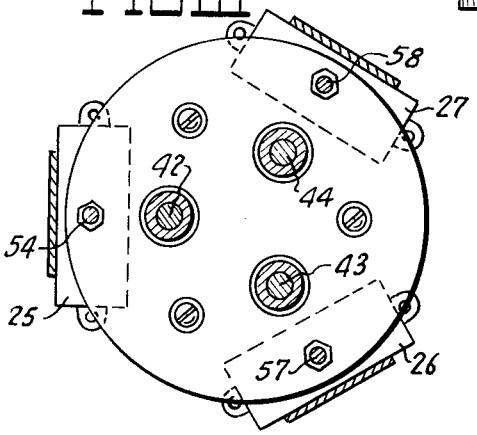
FIG. II
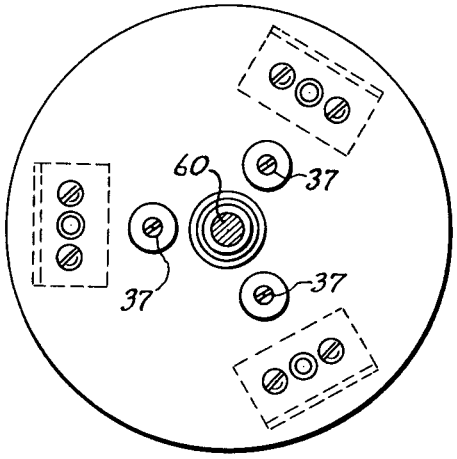
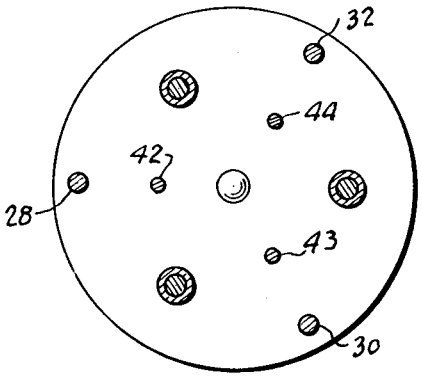
FIG. IV
INVENTOR.
William J. Williams
BY
Edmund B. Whitcomb
ATTORNEY MULTIPLE SWITCH SPEED CONTROLLED MECHANISM
Original Filed Feb. 16, 1954 4 Sheets-Sheet 2
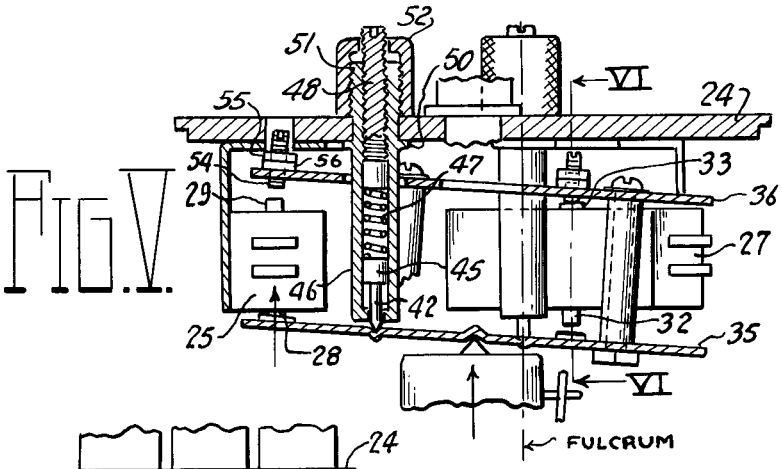
FIG. V.
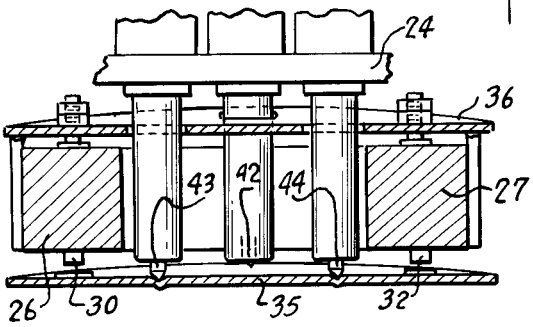
FIG. VI
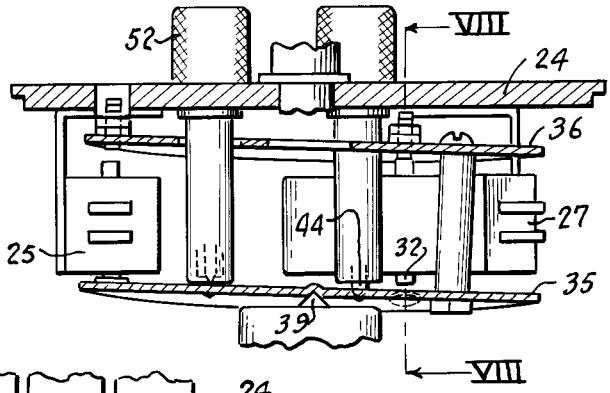
FIG. VII.
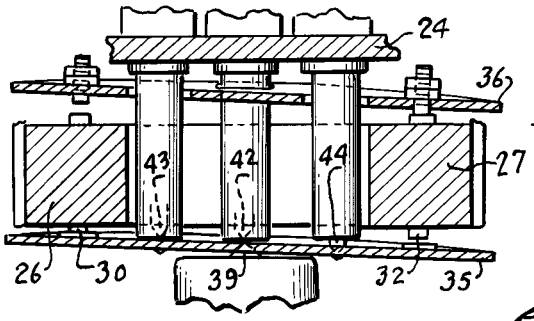
FIG. VIII.
INVENTOR.
William J. Williams
BY
Edmund B. Whitcomb
ATTORNEY MULTIPLE SWITCH SPEED CONTROLLED MECHANISM
Original Filed Feb. 16, 1954 4 Sheets-Sheet 3
FIG. IX.
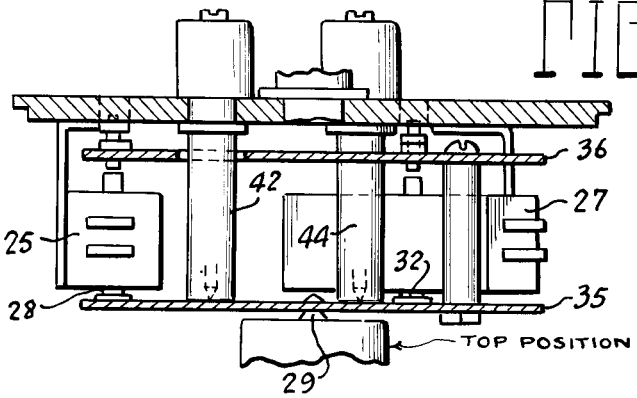
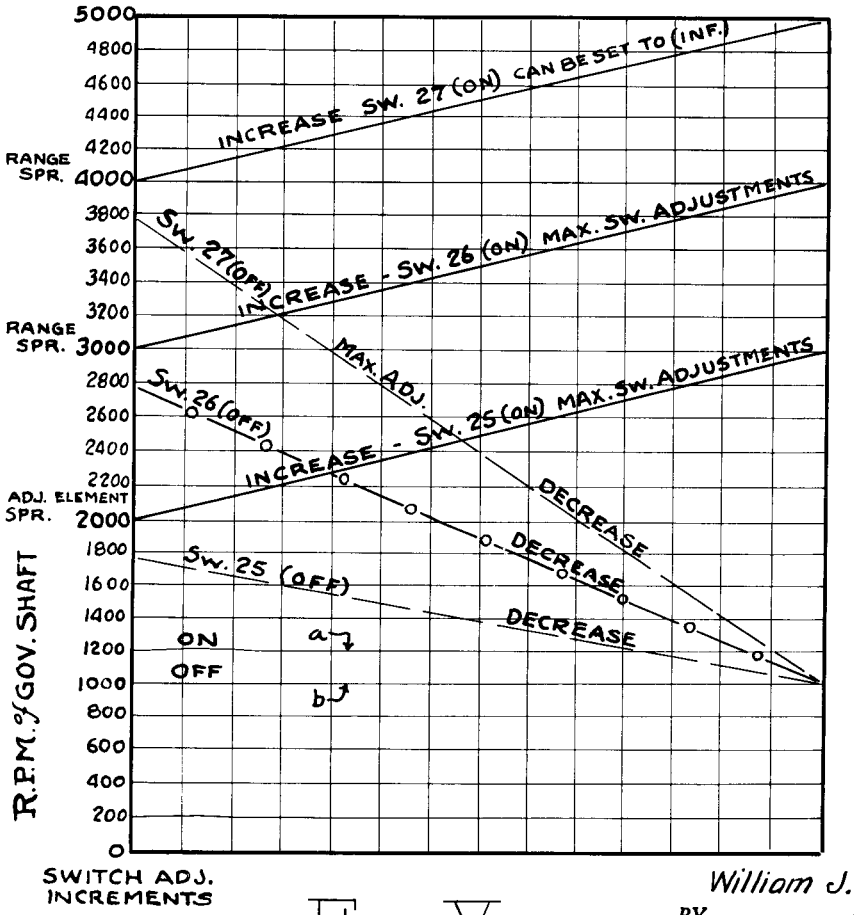
INVENTOR.
William J. Williams
BY
Edmund B. Whitcomb
ATTORNEY
FIG. X.

MULTIPLE SWITCH SPEED CONTROLLED MECHANISM
Original Filed Feb. 16, 1954 4 Sheets-Sheet 4
FIG XII
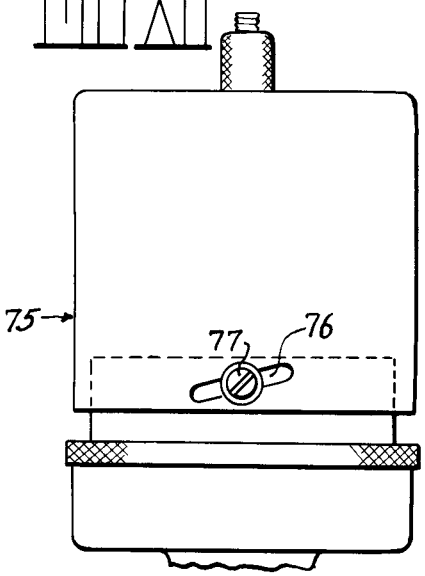
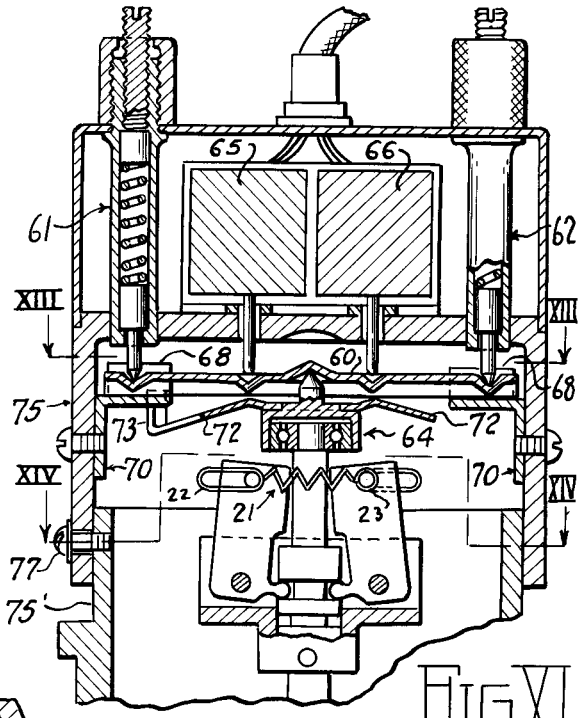
FIG XI
FIG XIII.
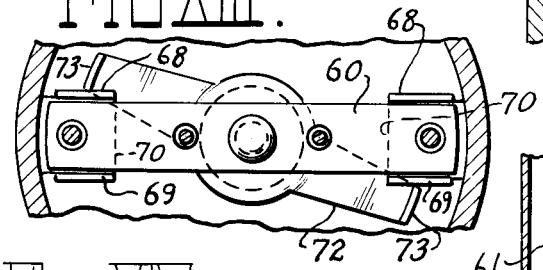
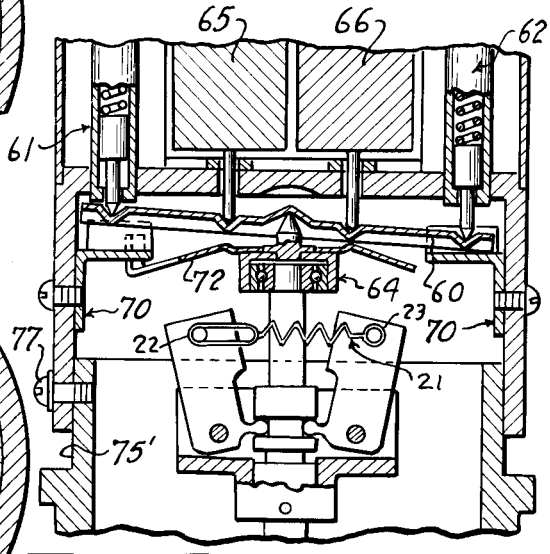
FIG. XIV
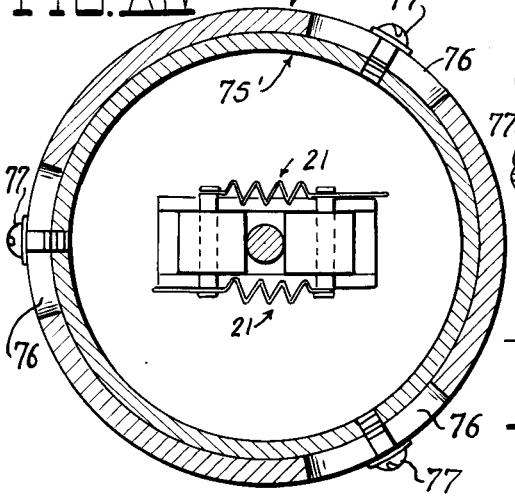
FIG XV
INVENTOR.
William J. Williams
BY
Edmund B. Whiteomb
ATTORNEY United States Patent Office Re. 25,854
Reissued Sept. 7, 1965

25,854
MULTIPLE SWITCH SPEED CONTROLLED MECHANISM

William J. Williams, 2800 Blackhawk Road, Wilmette, Ill.
Original No. 2,779,836, dated Jan. 29, 1957, Ser. No. 410,555, Feb. 16, 1954. Application for reissue Apr. 14, 1965, Ser. No. 453,864
10 Claims. (Cl. 200—80)

Matter enclosed in heavy brackets [ ] appears in the original patent but forms no part of this reissue specification; matter printed in italics indicates the additions made by reissue.

This invention relates to circuit controlling means adapted to open, close or transfer circuits in accordance with predetermined speeds of rotation of an element, an engine or other rotary means associated with the system involved or with which the circuit controlling means are to be connected.

An object of my invention is to provide an extremely versatile adjustable and efficient control mechanism for multiple stage operations actuating a plurality of switching means to effect changes in seriatum of said circuits according to a large number of desired conditions both upon an increasing and a decreasing speed of a rotational unit such as a governor, for example.

More specifically, my invention includes the provision of a self-contained compact driven unit with the plural controlling mechanism incorporated therein in an efficient manner for desired operation in predetermined orders. This invention also provides specific means for ready adjustment of each individual switching mechanism as well as adjustment for the overall combined action of my improved arrangement for a given system.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

FIGURE I is a side elevation of the installation on the end of a governor with the housing removed, parts being shown in section;

FIGURE I–A is a detail taken on the line IA—IA of FIGURE I;

FIGURE II is a top plan view;

FIGURE III is a section taken on the line III—III of FGURE I;

FIGURE IV is a section taken on the line IV—IV of FIGURE I;

FIGURE V is a partial sectional view similar to FIGURE I showing the operating mechanism in one switch operating position;

FIGURE VI is a sectional view taken on the line VI—VI of FIGURE V;

FIGURE VII is a sectional elevation similar to FIGURE V showing another position of the switch mechanism;

FIGURE VIII is a section taken on the line VIII—VIII of FIGURE VII;

FIGURE IX is a sectional elevation similar to FIGURE V showing a still further position;

FIGURE X is a diagrammatic illustration of the action of the switches correlated to the governor control;

FIGURE XI is a vertical sectional view of a modification of my invention in which two switches are controlled, the mechanism shown in inoperative position;

FIGURE XII is an elevational view of FIGURE XI showing an adjusting mechanism for the casing;

FIGURE XIII is a section taken on the line XIII—XIII of FIGURE XI;

FIGURE XIV is a transverse section taken on the line XIV—XIV of FIGURE XI; and

FIGURE XV is a vertical sectional view similar to FIGURE XI, but showing one of the switches in operative position.

Referring to the drawings, within a suitable housing (not shown) mounted is (as in my prior Patent No. 2,457,192) the governor shaft 12, the revolutions of which may vary by being connected with some mechanism whose speed varies. The shaft 12 carries the rotatable support 14 for the governor weights 15, the support 14 being pinned to the shaft 12 in the illustration. These governor weights 15 are pivoted as at point 16 to the support 14 so that under the centrifugal action of the revolving of shaft 12 these weights move outwardly and downwardly around the point 16 as a center.

A freely movable sliding plunger or controlling element 18 is provided with collars 19 and 19', while the weights 15 have a contact tongue or cam 20 fitting between collars 19 and 19' and adapted to move the plunger 18 longitudinally in line with the axis of the shaft 12 as cam 20 of the weights moves upwardly and downwardly as shown. It is to be noted that the weights 15 are recessed to receive the collar 19.

Each weight 15 is connected to the other weight by specially constructed "range" springs 21, one end of each spring 21 having an elongated loop 22 at one end and a closed end 23 at the other. These springs 21 control the weight but are not in the position illustrated in FIGURE I until the governor is at rest. As in my prior patent, I may provide a governor having a straight line curve in operation. The springs 21 have a modifying influence on the action of the weights 15.

The present invention relates primarily to improved switching means designed to open and close, or transfer circuits at definite speeds controlled by said governor action, which speeds may be set as desired for many varying conditions. In the embodiment illustrated, the governor mechanism is associated with three switches each of which transfers its contact when the governor reaches a predetermined speed and each is transferred back again when the speed drops, all as determined by the various settings hereinafter set forth.

Referring to FIGURE I, the top cover plate 24 is intended to be secured to the housing of the mechanism. Depending from this cover 24 and fixed thereto are three switch devices 25, 26 and 27 symmetrically arranged around the axis of the governor as illustrated in FIGURE III, for example. Each of these switches has upwardly and downwardly switch operating pins, switch 25 having downwardly extending pin 28 and upwardly extending pin 29, switch 26 having the downwardly extending pin 30 and upwardly extending pin 31 and the switch 27 having downwardly extending pin 32 and upwardly extending pin 33.

The main operating mechanism for these switch pins consists of two discs 35 and 36 connected together by suitable spacers 37 so that each disc 35 and 36 moves longitudinally and tilts as a unit with the other disc. FIGURE I illustrates the lowermost inoperative position of the mechanism where it will be seen that the lower disc 35 has a recess 38 whereby this floating disc mechanism is pivoted at the end of a thrust bearing carried on the governor shaft by the plunger 18. The pivot is illustrated at 39. A suitable ball bearing 40 has the outer casing thereof prevented from rotating by connection 41 with the lower plate 35 while the plunger 18 is centered on the inner ball race of said unit 40. It will be understood that the floating disc unit 35–36 may move upwardly and downwardly and tilt to a certain degree but is prevented from rotating as will hereinafter appear.

As the governor speed increases, the plunger 18 will move upwardly and since it pivotally supports the lower plate 35 on the pivot 39, I have provided a mechanism for causing the plates to actuate the pins of the switches in a desired sequence due to the movement and tilting of said floating disc unit 35 and 36. To this end, I have three depending spring loaded pivot points 42, 43 and 44 depending from the cover 24 by a suitable adjusting mechanism forming an important part of my invention. Thus, as illustrated more particularly in FIGURE V, one of the pivots 42 is actually constructed in the form of a plunger element having a head 45 located within a tube 46, said tube being fixed in the cover plate 24 attached to the housing of the mechanism. Above the head 45 of the pivot plunger 42 is a spring 47 loaded to produce a certain resistance against movement of the plunger by the plate 35 and in order to provide an adjustable means therefor, I provide within the upper end of the tube 46, a central screw-threaded adjustable pin 48 so that by adjusting the same in the screw threads in the inside of the tube 46 the load on the spring 47 may be changed as desired. A suitable way for fixing the tube 46 to the head 24 is to provide the same with a lower collar 50 and external screw threads 51 whereupon the tubular nut 52 may be used to clamp the tube 46 into the head 24 by reason of the flange 50. The same construction is used for each of the other pivot points 43 and 44.

As shown in FIGURES II and III, it will be noted that these pivot pins 42, 43 and 44 are symmetrically arranged around the governor axis and that the several switch pins of the switches 25, 26 and 27 are radially in line with the pivots 42, 43 and 44.

Since the adjustability of the operation of the switching mechanism is an important feature of my invention, I also provide means for varying the time at which the upper switch pins of the several switches 25, 26 and 27 may be operated. To this end, as shown in FIGURES I and V, the upper plate 36 carries three switch pin contacting elements, each in the form of a screw-threaded small cylinder 54 screw-threaded in the upper plate 36, and is provided with a pair of lock nuts 55 and 56 so that upon withdrawal of the same from the plate the contact element or cylinder 54 may be adjusted upwardly or downwardly and locked in fixed position by the cooperating lock nuts 55 and 56 screw-threaded on the outside of said contactor 54. It is to be understood that I also provide two similar adjustable contact units 57 and 58 symmetrically arranged around the axis of the governor, as shown in FIGURE III, and each of these contacts 57 and 58 are adjustaable as described above in connection with the lock nuts 55 and 56 for the adjustable contactor 54. It will be also noted that these several contacts 54, 57 and 58 are radially in line with the pivots 42, 43 and 44.

It will be noted that centrally above the cover plate, I provide suitable electrical terminal connectors 60 by means of which various line wires can be connected and properly connected with the various switches 25, 26 and 27, dependent on any particular installation of the controlling apparatus.

The operation of the mechanism is as follows:

As the speed of the governor increases, the plunger 18 and consequently the pivot 39 move upwardly. Since the pivot 39 carries the floating dual disc member having the plates 35 and 36, this element moves accordingly. The various adjustments for the pivots 42, 43 and 44 having been made as desired so that the various loaded springs operate at different times, it will be seen that as the lower disc 35 moves upwardly, as in FIGURE V, for example, the plate 35 moves pin 42 overcoming the pressure of the spring 47 so that the plunger retracts in the tube 46 the same. The springs for the pivots 43 and 44 both being loaded to a higher degree than the spring for pivot 42, resist upper movement of the plate 35 in the action just described, so that, the pivot 42 having retracted the plate pivots around a line connecting the two pivots 43 and 44 to force the pivot 42 to retract so that the plate operates the switch pin 28 of the switch 25.

As the speed of the governor still further increases, the plunger 18 moves still further upwardly carrying with it the dual plate mechanism 35 and 36. Since the resistance of the spring for the pivot 43 is less than for the pivot 44, the pivot 43 thereupon retracts and the plate 35 tilts around an axis formed by a line between pivots 44 and 42. Consequently, the lower pin 30 of switch 26 is now operated at the proper time as determined by the adjustments.

As the governor speed still further increases and the plunger 18 moves still further upwardly, as shown in FIGURE IX, the last switch is operated since plate 35 now tilts around a line formed by the pivots 42 and 43. This causes the lower plate 35 to contact the switch pin 32 of the third switch 27. The position of the actuating mechanism in this condition is illustrated in FIGURE IX where it will be seen that the plate 35 is substantially horizontal and contacting the ends of the tubes 46 for the respective pivots 42, 43 and 44 and all the lower switch pins of the switches 25, 26 and 27 have been actuated by the action described.

Upon reversal of the speed and a decrease therein, the plunger 18 naturally lowers. This brings into play the upper floating disc 36 and it is this disc which operates the upper pins 29, 31 and 33 of the switches 25, 26 and 27. Simultaneously with this action, the lower plate 35 will be sequentially removed from the previously described action of operating the lower switch pins 28, 30 and 32 of said switches. To further consider the action of the upper plate 36, it will be noted that the vairous adjustments in the locking nuts 55 and 56 for the several contactors 54, 57 and 58 must have been set at the desired position, whereupon as the plate 36 moves downwardly due to the recession of the plunger 18, this plate 36 being fixed to the lower plate 35 will be tilted in the reverse order from that just described as to the tilting of the lower plate on the upper movement of the plunger 18. For example, the contactor 58 illustrated in FIGURE V will contact the upper pin 33 of the switch 27 before the other switches 26 and 25 are operated on the reverse order of the descending plunger 18.

This action is illustarted in the diagram of FIGURE X which is a composite of the action of the mechanism in that the speeds of the governor illustrated in the coordinates and in the lower scale the ordinate is an increment of adjustment for the means controlling the lower plate 35 while at the top the ordinates are indicated as units for adjustment for the several contactor elements 54, 57 and 58 for the upper plate 36. In this chart of the diagram of FIGURE X, the full line represents the action of the lower switch pins upon increasing speeds and the dotted line illustrates the action of the upper switch pins 33, 31 and 29 upon the descending action of the upper plate 36. Unless the adjustments provided herein were utilized the full lines and dotted lines of FIGURE X would be parallel, but by the various adjustments herein provided, I may be able to vary the relative times at which any one of the switches 25, 26 or 27 may be reversely operated compared with its time of operation on the upwardly extending action of the governor through the plunger 18.

In the two switch control mechanism shown in FIGURES XI–XV, I use the range springs 21 connecting the governor weights, the springs having the elongated loop 22 on one end and the closed loop 23 on the other end as in the other embodiment. In this embodiment, however, I use only one "floating" plate 60 with two adjustable pivot posts 61 and 62 to regulate the tilting of the single plate 60 as it is moved upward by the thrust bearing 64 on the upper end of the governor shaft. These pivot posts 61 and 62 are substantially similar to the pivots 50 shown in section in FIGURE V of the other modification and the sequential contact therewith by the tilting of plate 60 operates switches 65 and 66 in one direction, in seriatum, these switches being returned to original position by gravity or internal switch springs. It is to be understood that the speed of the governor controls the position of the thrust bearing 64 as in the other embodiment so that the action is speed controlled. It is to be noted particularly in FIGURE XIII that the plate 60 is prevented from rotating by ears 68 and 69 on angle pieces 70 located on diametrically opposite portions of the casing, as shown. In order to prevent the outer race of the thrust bearing 64 from rotating, I also provide opposite radial extension plates 72 connected to the outer race bearing 64, said radial extensions having upwardly turned ends 73 which, by contact with said angle pieces 70, prevent rotation of the outer portion of the thrust bearing 64.

In this embodiment illustrated in FIGURES XI to XV, the two part relatively adjustable housing 75 is used to adjust and set the general time for operation of the entire two switch adjustable mechanism. Specifically, I show in FIGURES XII and XIV, three circumferentially arranged inclined slots 76. The lower fixed part of the governor casing 75' is provided with set screws 77 adapted to be positioned within said slots 76 so that by twisting the housing 75 the position longitudinally of the axis of the governor shaft will be varied by reason of this pin and slot connection 76 and 77. It is to be understood that the screws 77 may be screwed home and hold the housing 75 in any set position desired within the limits of the slot 76.

The range springs 21 and the individually adjustable pivots 61 and 62 determines the exact operation of each of the two switches controlled in the mechanism of this embodiment of FIGURES XI–XV, and operate similarly to the operation of these elements in the embodiment illustrated in FIGURES I to X.

It is apparent that, within the scope of the invention, modifications and different arrangements may be made other than is herein disclosed, and the present disclosure is illustrative merely, the invention comprehending all variations thereof.

What I claim is:

1. A multiple switch opening and closing speed controlled mechanism including a housing; a governor mechanism within said housing adapted to be driven at various speeds; an extendable and retractible member located in said housing and controlled by said governor; a plurality of electrical switch units spaced around the axis of the governor and fixed in said housing, said switch units each having oppositely extending actuating pins with the axis of said pins substantially parallel to said axis; a pair of movable connected spaced movable and tiltable disks, one on one side and the other on the other side of said switch units, said disks having means to contact and actuate said switch pins, said governor member positioned in contact with one of said disks to move both disks proportionately to the movement of said member dependent upon said governor speed whereby a disk contacts said switch pins to actuate said switches in seriatum in one direction; means to move said disks in the opposite direction whereby a disk actuates said switches in the opposite direction; and means to adjust the relative position of the switch pin contacting means of said disks to vary the predetermined speeds for both opening and closing said switches.

2. In combination, a governor spindle raised and lowered according to speed; a housing carrying three switches and switch pins spaced transversely around the governor shaft above said spindle; a retractable spring loaded pivot pin adjacent each switch pin; a fixed tube around each pin, each of said springs being loaded to release at successively different pressures around the governor axis; and a tiltable plate movably carried by said governor spindle and adapted to contact and retract the least loaded spring held pivot, said plate arranged upon further movement of said spindle to contact the other two pivots and tilt along a line joining said pivots whereby said plates actuates the switch adjacent said first pivot; further movement of said governor spindle causing the second of said spring loaded pivot to retract said plate tilts in another plane along a line joining the third pivot and the end of the tube surrounding the first pivot to actuate the second switch; and still further movement of said governor spindle causes said plate to move along the axis of said governor spindle to actuate the third switch and thereafter contact the lower ends of all three pivot enclosing tubes.

3. In combination, a governor spindle raised and lowered according to speed; a housing carrying three switches and switch pins spaced transversely around the governor shaft above said spindle; a retractable spring loaded pivot pin adjacent each switch pin; a fixed tube around each pin, each of said springs being loaded to release at successively different pressures around the governor axis; and a tiltable plate movably carried by said governor spindle and adapted to contact and retract the least loaded spring held pivot, said plate arranged upon further movement of said spindle to contact the other two pivots and tilt along a line joining said pivots whereby said plate actuates the switch adjacent said first pivot; further movement of said governor spindle causing the second of said spring loaded pivot to retract said plate tilts in another plane along a line joining the third pivot and the end of the tube surrounding the first pivot to actuate the second switch; and still further movement of said governor spindle causes said plate to move along the axis of said governor spindle to actuate the third switch and thereafter contact the lower ends of all three pivot enclosing tubes; and another movable and tiltable plate connected to move with said first plate, located in said housing above said switches, said switches having another set of pins in the line of movement of said plate to actuate said switches in the reverse direction from said first-mentioned pins; said last-mentioned plate adapted to actuate said last-mentioned pins in seriatum in the reverse order of their actuation by the first plate.

4. A multiple switch closing and opening speed controlled mechanism including a housing; a governor mechanism within said housing adapted to be driven at various speeds; an extendable and retractable shaft located in said housing and controlled by said governor; a plurality of electrical switch units spaced around said shaft and fixed in said housing, said switch units each having outwardly extending actuating pins with the axis of said pins substantially parallel to said shaft; movable floating disk means; adjustable pivots for controlling said [disks] *disk means, said disk means* arranged to contact said switch pins to actuate said switches and means to adjust the position of each of said pivots relative to said disk means to vary the predetermined times for actuating said switches, said shaft positioned in contact with said [disks] *disk means* and arranged to move said [disks] *disk means* proportionately to the movement of said shaft dependent upon said governor speed; and restraining range springs on said governor connected with the governor weights to control the action of said extendable and retractable shaft, said range springs having means to render said springs ineffective during the initial range of speeds of said governor and cooperating with the setting of the adjustment of said switch pivots.

5. A multiple switch closing and opening speed controlled mechanism including a housing; a governor mechanism within said housing adapted to be driven at various speeds; an extendable and retractable shaft located in said housing and controlled by said governor; a plurality of electrical switch units spaced around said shaft and fixed in said housing, said switch units each having actuating pins positioned with the axis of said pins substantially parallel to said shaft; a movable floating disk located adjacent said pins of said switch units; spring loaded adjustable pivots adapted to be contacted by said disk, said disk arranged to actuate said switch pins in a predetermined sequence under control of said pivots and dependent upon said extendable and retractable shaft, means to adjust the position of each of said pivots relative to said disks to vary the predetermined times for actuation of said pins for actuating said switches, said shaft positioned in contact with said disk and arranged to move said disk proportionately to the moveemnt of said shaft dependent upon said governor speed; and restraining range springs connected with the fly weights of said governor and having means to provide delayed control of the action of said governor on said extendable and retractable shaft, said range springs cooperating with the setting of the adjustment of said switch pivots.

6. A multiple switch closing and opening speed controlled mechanism including a two part housing, said parts being relatively adjustable with respect to each other; a governor mechanism within one of said housing parts adapted to be driven at various speeds; an extendable and retractable shaft located in said housing and controlled by said governor; a plurality of electrical switch units spaced around said shaft and fixed in the other of said housing parts, said switch units each having actuating pins positioned with the axis of said pins substantially parallel to said shaft; a movable floating disk located adjacent said pins of said switch units; spring loaded adjustable pivots adapted to be contacted by said disk, said disk arranged to actuate said switch pins in a predetermined sequence under control of said pivots and dependent upon said extendable and retractable shaft, means to adjust the position of each said pivots relative to said disk to vary the predetermined times for actuation of said pins for actuating said switches, said shaft positioned in contact with said disk and arranged to move said disk proportionately to the movement of said shaft dependent upon said governor speed; range springs on said governor to provide delayed control of the action of said extendable and retractable shaft, said range springs cooperating with the setting of the adjustment of said switch pivots; and said two part housing portions having overlapping contacting flanges; *said means to adjust the position of said pivots comprising* an inclined slot on one of said flanges and a locked set screw passing from the outside through said slot to the other flange of the other housing part whereby turning one of said housing parts adjusts the relative position of said two part housing portions to vary the position of said switch pins relative to said governor controlled operating mechanism therefor.

7. In a automatic speed controlled multiple switching mechanism having not less than three switch units, the combination of a housing assembly; a governor mechanism within said housing adapted to be driven at various speeds; an extendable and retractable shaft controlled by said governor; a switch actuating assembly including a pair of spaced members connected to move in unison: means securing a plurality of circumferentially spaced switch units in a housing part, said switch units positioned between said spaced members and spaced therefrom; a plurality of separately adjustable spring loaded pivots supported within a housing part so as to be contacted by said switch actuating members; means associated with each switch unit whereby one of said members closes a switch and means whereby the other of said members opens the same switch; means controlled by said extendable and retractable shaft whereby said members move in unison in one direction to cause said members to contact said pivots to tilt said members to cause said members to effect closing of a switch and said members move in the opposite direction to effect opening of said switch at a predetermined speed independently of the closing of the same switch.

8. A multiple switch closing and opening speed controlled mechanism including a two part housing, said parts being relatively adjustable with respect to each other; a governor mechanism within one of said housing parts adapted to be driven at various speeds; an extendable and retractable shaft located in said housing and controlled by said governor; a plurality of electrical switch units spaced around said shaft and fixed in the other of said housing parts, said switch units having actuating pins positioned within said housing to be automatically actuated to close and open said switches; a pair of movable floating switch pin actuating elements located adjacent said pins of said switch units; spring loaded adjustable pivots adapted to be contacted by said elements, said elements arranged to move in unison and to actuate said switch pins in a predetermined sequence under control of said pivots and dependent upon said extendable and retractable shaft, means to adjust the position of each of said pivots relative to said elements to vary the predetermined times for actuation of said pins for actuating said switches, said shaft positioned in contact with one of said elements and arranged to move said elements proportionately to the movement of said shaft dependent upon said governor speed; governor weight controlling springs on said governor to provide control of the action of said extendable and retractable shaft, said governor weight controlling springs cooperating with the setting of the adjustment of said switch pivots; and said two part housing portions having overlapping contacting flange portions; *said means to adjust the position of said pivots comprising* an inclined slot on one of said flange portions and a locking set screw passing from the outside through said slot to the other flange portion of the other housing part whereby turning one of said housing parts adjusts the relative position of said two part housing portions to vary the position of said switch pins relative to said governor controlled operating mechanism therefor.

9. In combination, an extendable and retractable shaft adapted to be raised and lowered according to various controlling condition responsive means; a housing carrying a plurality of switches and switch pins spaced transversely around said shaft above said condition responsive means; a retractable spring loaded pivot pin adjacent each switch pin; a fixed tube around each pin, each of said springs being loaded to release at successively different pressures; and a tiltable plate movably carried by said shaft and adapted to move and retract the least loaded spring held pivot, said plate arranged upon further movement of said shaft to tilt along a line joining two pivots whereby said plates actuates the switch adjacent said first pivot; further movement of said shaft causing the second of said spring loaded pivots to retract and said plate tilts in another plane along a line joining a pivot and the end of the tube surrounding the first pivot to actuate another switch.

10. A multiple switch closing and opening speed controlled mechanism including a two part housing, said parts being relatively adjustable with respect to each other; a governor mechanism within said housing adapted to be driven at various speeds; an extendable and retractable shaft located in said housing and controlled by said governor; a plurality of electrical switch units spaced around said shaft and fixed in one of said housing parts, said switch units having actuating pins positioned within said housing to be automatically actuated to close and open said switches; a movable disk located adjacent said pins of said switch units; spring loaded adjustable pivots adapted to be contacted by said disk, said disk arranged to actuate said switch pins in a predetermined sequence under control of said pivots and dependent upon said extendable and retractable shaft, means to adjust the position of each of said pivots relative to said disk to vary the predetermined times for actuation of said pins for actuating said switches, said shaft positioned in contact with said disk and arranged to move said disk proportionately to the movement of said shaft dependent upon said governor speed; governor weight controlling [said] springs on said governor to provide control of the action of said extendable and retractable shaft, said governor weight controlling springs cooperating with the setting of the adjustment of said switch pivots; and said two part housing portions having overlapping contacting portions; *said means to adjust the position of said pivots comprising* an inclined slot on one of said portions and a locking set screw passing from the outside through said slot to the other portion of the other housing part whereby turning one of said housing parts adjusts the relative position of said two part housing portions to vary the position of said switch pins relative to said governor controlled operating mechanism therefor.

References Cited by the Examiner

The following references, cited by the Examiner, are of record in the patented file of this patent or the original patent.

UNITED STATES PATENTS

| | | | |
|---|---|---|---|
| 2,454,069 | 11/48 | Lefler | 200—168 |
| 2,457,192 | 12/48 | Williams | 200—80 |

ROBERT K. SCHAEFER, *Primary Examiner.*